United States Patent Office 3,344,702
Patented Oct. 3, 1967

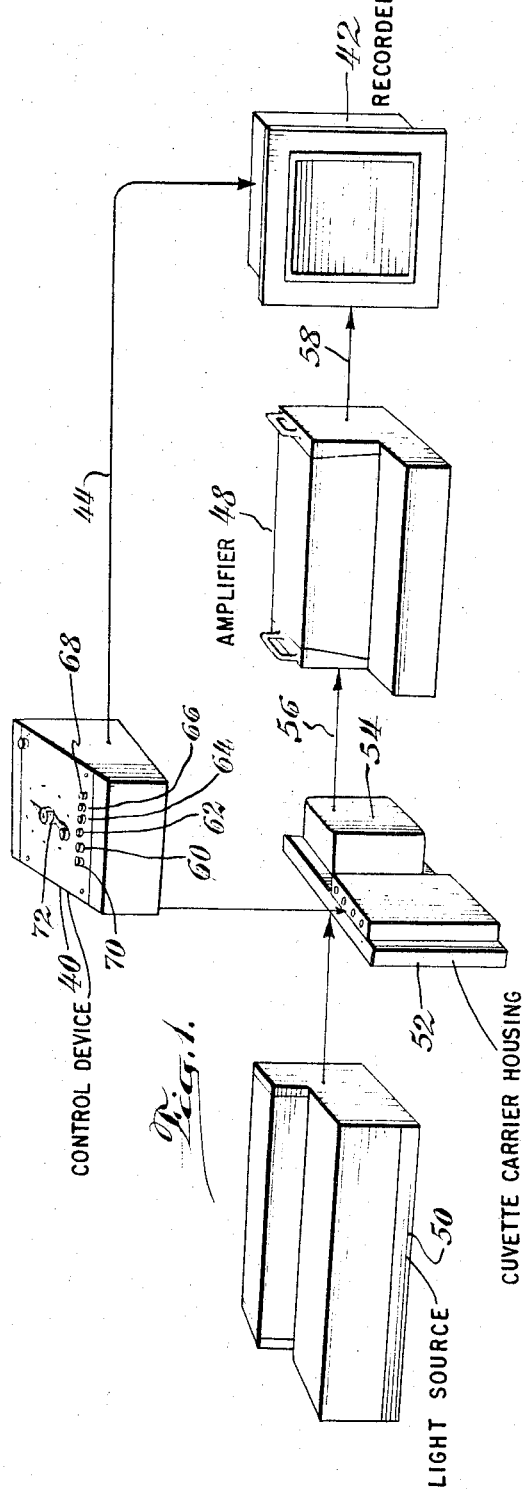
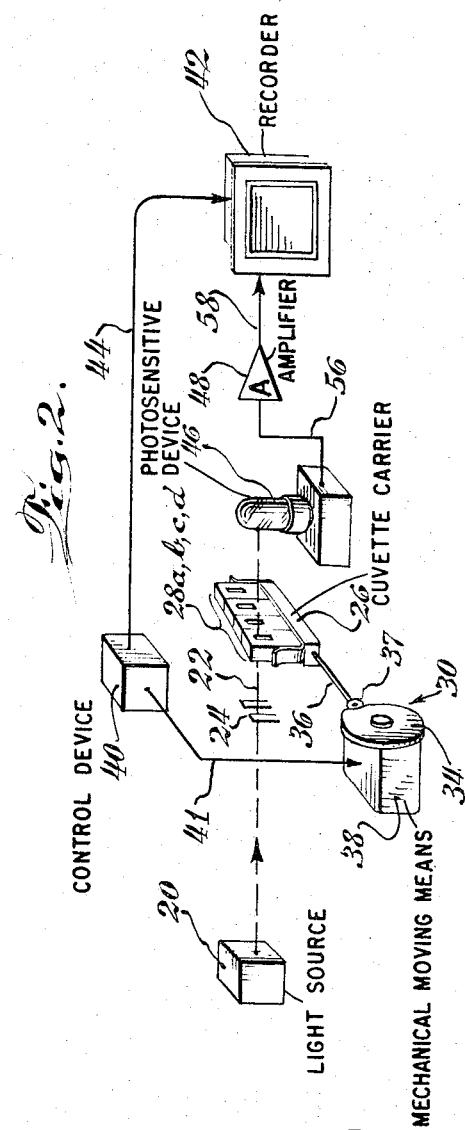

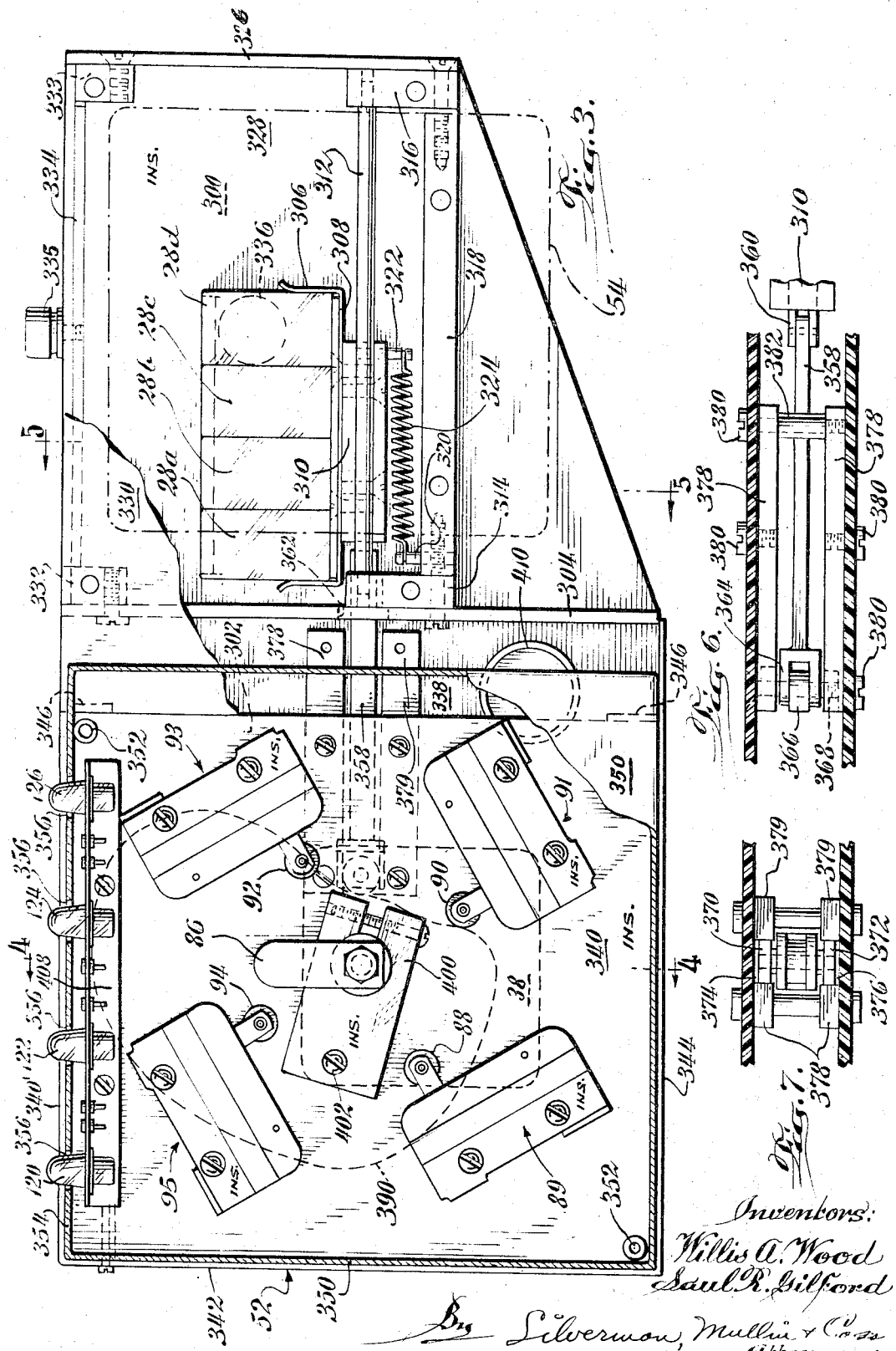

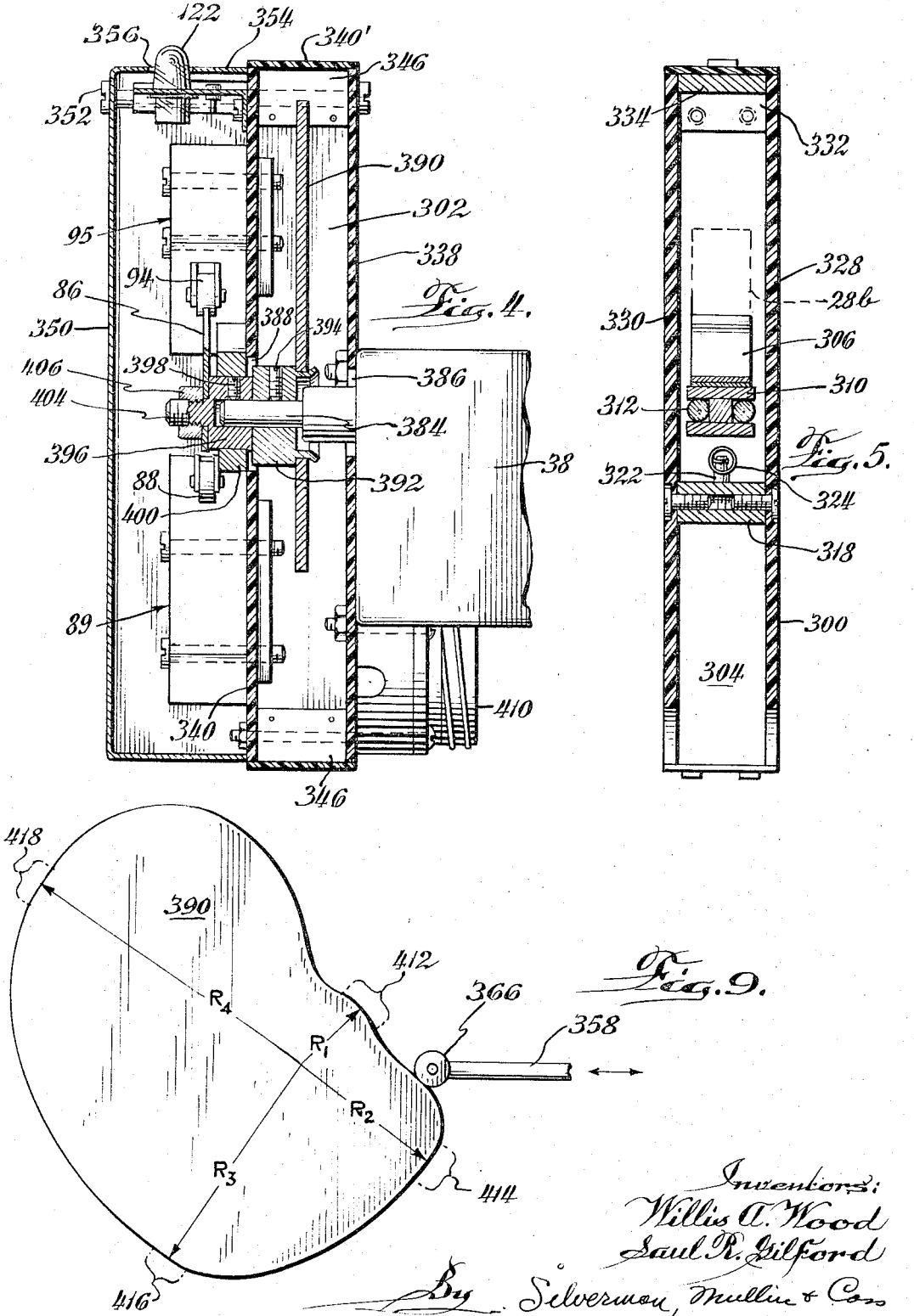

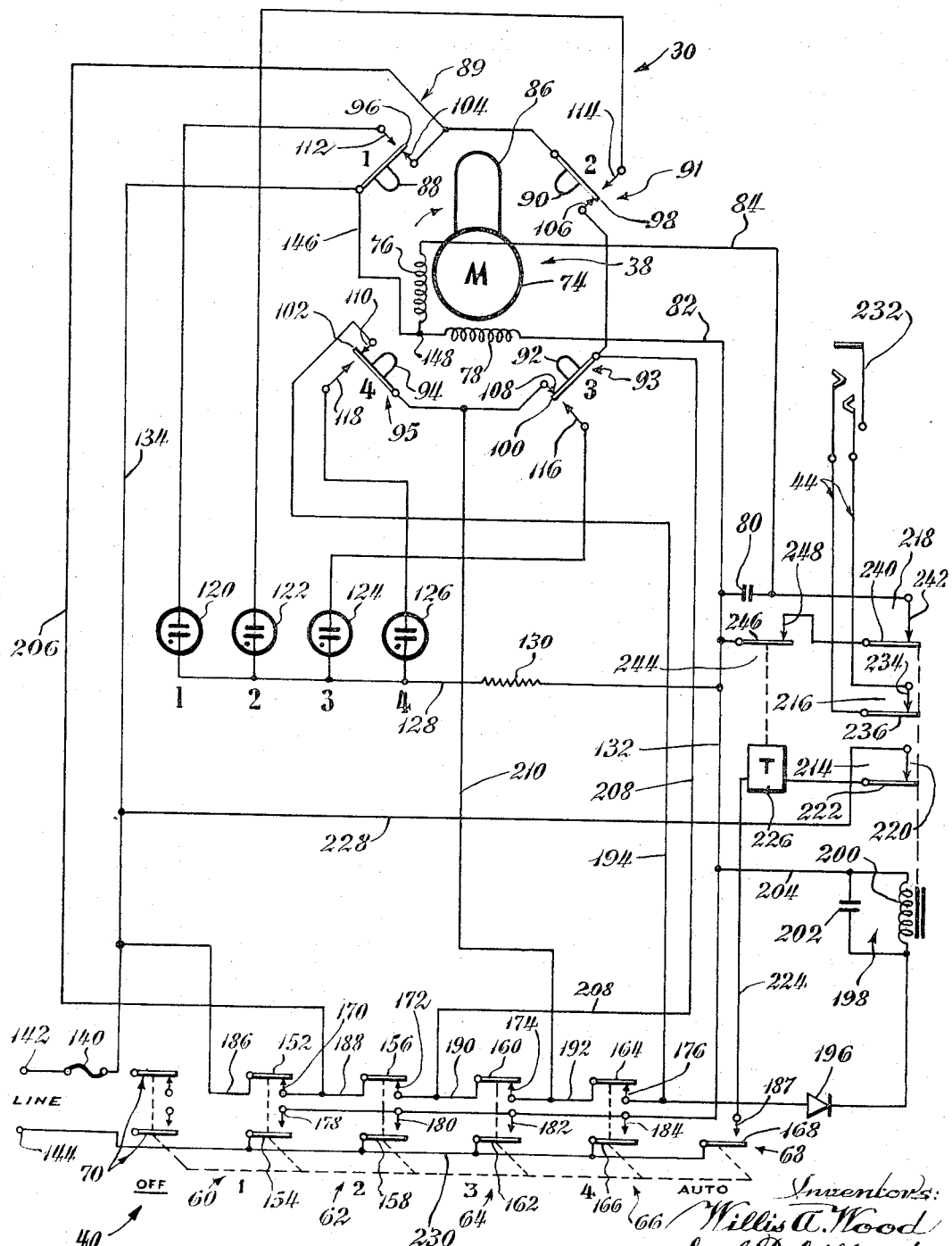

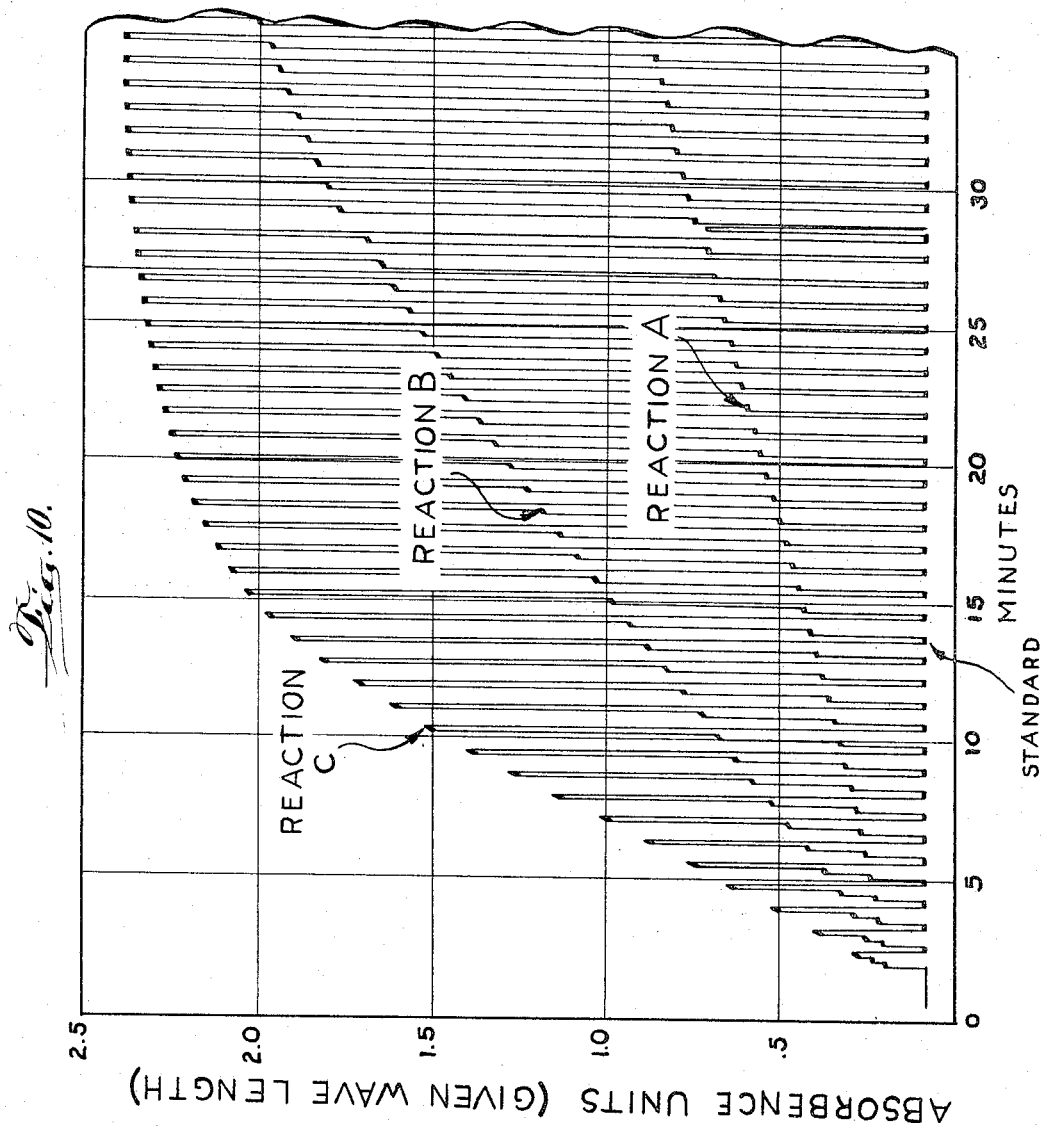
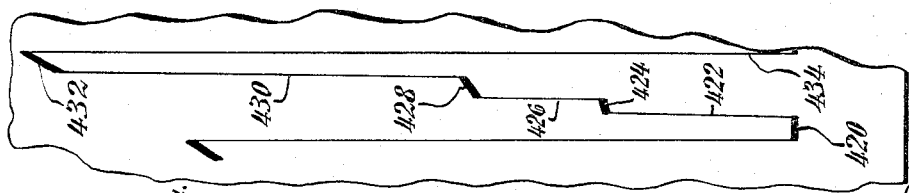

3,344,702
MULTIPLE SAMPLE ABSORPTION RECORDING APPARATUS HAVING A SELECTIVELY VARIABLE CUVETTE POSITION CYCLE AND MEANS TO DEENERGIZE THE RECORDER BETWEEN MEASUREMENT PERIODS
Willis A. Wood, Okemos, Mich., and Saul R. Gilford, Oberlin, Ohio, assignors to Gilford Instrument Laboratories, Inc., Oberlin, Ohio, a corporation of Ohio
Continuation of application Ser. No. 54,421, Sept. 7, 1960. This application Oct. 23, 1965, Ser. No. 518,496
9 Claims. (Cl. 88—14)

This application is a continuation of our co-pending application Ser. No. 54,421, filed Sept. 7, 1960, entitled, "Optical Density Analytical Apparatus," and now abandoned.

This invention relates generally to apparatus for use in making physical measurements in the medical, biological and other fields, and more particularly is concerned with such apparatus which is used in examining and analyzing phenomena by means of measuring the absorbance of light in a multiplicity samples of substances being studied.

Many biological, physiological, chemical and interrelated phenomena are analyzed by passing light through solutions, suspensions and fluids. The light is of a constant wave length, which may be changed for different conditions. Flow rate of blood through the heart can be computed on the basis of measuring the dilution of tracer materials introduced into the heart through a vein and sampled at a peripheral artery through the use of a densitometer. The concentration of any substance can be measured in cases where the concentration is proportional to optical density, by measuring the absorbance of light passing through suspensions or solutions of the substance. Many kinds of reactions, such as enzyme catalyzed reactions can be studied by measuring absorbance.

The usual method of measuring absorbance is to place the solution being measured in a small cell or curvette, as the chamber is called, portions of opposite walls of which are transparent relative to the wave length of the light being used, and to interpose the cuvette between a source of the light and a photo-sensitive detecting element. The output of the photo-sensitive element is amplified and measured, the meter being calibrated in terms of light absorbance or optical density. In recent years, amplification of the output of the photo-sensitive element has preferably been accomplished in accordance with a logarithmic function in order that the meter scale be linear relative to optical density. The problem of low intensities of incident light has been solved through the use of photo-multipliers as the photo-sensitive elements and various circuit arrangements have been proposed and used which enable achievement of the linear output desired.

There has been, however, a long-felt need for an apparatus which utilizes the basic principles of analysis through measurement of light absorbance, but which will provide continuous information of kinetic reactions occurring over relatively long periods of time, not only for a single sample, but for a multiplicity of samples, all carried out coterminously. An important object of the invention is concerned with the provision of such apparatus, and specifically to provide apparatus or a system for furnishing recorded data on such kinetic reactions.

The invention herein solves many problems which have beset laboratory workers in the past. The difficulties with the use of the light absorbance technique have included: achieving accurate time exposures at accurately controlled intervals; eliminating human error where many measurements and movements must be made at high speed; positively and accurately positioning the cuvettes with respect to the incident beam of light; and accurately recording the observations of the kinetic reactions occurring simultaneously in a multiplicity of samples.

An important object of the invention is to provide a system which comprises a source of monochromatic light or a source which is capable of being adjusted or varied for achieving a fine beam of light of any one of a wide range of wave lengths or a series of varying wave lengths for spectral analysis; a cuvette positioning device by means of which a program for discretely interposing one or more of a plurality of cuvettes can automatically and repetitively be carried out and including control apparatus for operating the positioning device and pre-setting the programming thereof; a detecting device, such as a converter which receives the beam of light from the source passing through the cuvette and provides an output signal which is a function of the absorbance of the particular wave length of the light by the material contained in the cuvette, it being preferred that the converter include an amplifying system operating on a logarithmic characteristic so that the output is linear with respect to absorbance; and a recording device driven by the output of the converter to give a continuous record of the signal received from the detecting device.

The achievement of the above mentioned object to a great extent depends upon an important consideration which it is believed has not been appreciated until the advent of this invention. When recording kinetic reactions, whether of a single sample or a multiplicity of samples, the movement of the cuvette from position to position results in substantial changes in the intensity of the light impinging on the photo-sensitive element. The information which is sought is hardly enhanced by the inclusion upon the record paper of the spurious responses by the recording instrument of the excursions of its pen for cuvette movements and conditions which are of no interest. Rather, such recorded information is confusing, misleading and often masks the principal information sought. The invention herein contemplates a recorder inactivating or immobilizing means which operates in synchronism and in cooperation with the cuvette positioning means so that the recording pen is not operated unless a measurement is being made. The results of this arrangement are that the undesired excursions of the recording meter between actual desired readings are embodied in straight lines normal to the direction of movement of the recording paper which can be ignored, while the desired information only occurs as graph lines having at least a component in the direction of movement of the paper to produce open portions clearly seen and readily measured.

The above arrangement, the accomplishment of which is an important object of the invention, enables the graphed information of a multiplicity of coterminously obtained readings readily to be seen upon the recording paper because of the great contrast between such desired information and the undesired information, because the amplitude of any curve is a function of the light absorbance and the width of the open portions represents the duration of the respective readings.

An important phase of the invention is the provision of the novel cuvette positioning device whose purpose is accurately and quickly to place one of a multiplicity of cuvettes in the beam of light and to hold it there for a predetermined length of time. This device operates in conjunction with a novel control circuit which enables the operator to choose any one or more of the cuvettes to be positioned discretely in the beam; enables the time of exposure to be adjusted to any desired value; enables any combination of the cuvettes to be exposed in sequence, omitting one or more from the sequence; and which includes the disabling means that operates to immobilize the recording device at any time that there is no motionless cuvette in the light beam.

The mechanical structure of the cuvette positioning device is an outstanding feature of the invention. In this art, the volume of fluid in the cuvette may be minute and the dimension exposed to the beam of light may be extremely small—of the order of one millimeter—and the beam itself may be defined by a pinhole. It is understandable, therefore, that the placement of a multiplicity of cuvettes must be precise with respect to both position and time. The invention has as a further object the provision of a novel cuvette positioning mechanism which accomplishes the accurate, sequential, and cyclic placement of the cuvettes. This object is accomplished by a novel synchronizing arrangement which temporarily retains the test cuvette in a precisely predetermined position with respect to the path of the light beam, while the cuvette moving means is disabled.

The accurate positioning of a multiplicity cuvettes in a reliable manner has been an unsolved problem heretofore. This invention eliminates all manners of detents with their wear problems, eliminates the overshoot of inertia-effected devices and the indeterminate positioning resulting from variations in friction and other causes.

It is not feasible to enumerate the objects of the invention herein, either in terms of the structures which are desired to be constructed in accordance with the teachings of the invention or in terms of the functions, measurements and analyses which can be accomplished therewith, but it must be pointed out that these extend far beyond the minimum which have been enumerated above. Complex analyses of many different kinds, never before capable of being recorded in as facile and simple a manner are now possible with the apparatus herein. For example, it is not known that any apparatus using the technique of measuring light absorbance has ever been capable of handling a multiplicity of samples all at one time, programming them in successive intervals of controlled amounts in order to achieve on a single record, the history of all of the reactions.

Many uses, techniques, structures and modifications of the system and the individual parts thereof will occur to those skilled in the art to which the invention herein appertains, but it is desired to point out that the nature of the invention is such that it lends itself to such flexibility. Because of this, the preferred embodiment as illustrated in the drawings and described in detail in the specifications is to be considered only as one preferred manner in carrying out the invention—an example, as it were.

In the said drawings, in which the same characters of reference are used throughout the several views thereof to designate the same or equivalent elements:

FIG. 1 is a semi-diagrammatic view showing the components of a system constructed in accordance with the invention herein.

FIG. 2 is a similar semi-diagrammatic view but utilizing functional symbols to designate the various components of the system.

FIG. 3 is a sectional view through the cuvette positioning device with portions shown in elevation.

FIG. 4 is a sectional view through the cuvette positioning device along the line 4—4 of FIG. 3 and in the indicated direction.

FIG. 5 is a sectional view through the cuvette positioning device along the line 5—5 of FIG. 3 and in the indicated direction.

FIG. 6 is a fragmentary top elevational view of the cam follower and its guide means.

FIG. 7 is a fragmentary end-on elevational view of the same.

FIG. 8 is a circuit diagram of the control circuit of the cuvette positioning device.

FIG. 9 is a plan view of the cam which governs the movement of the cam follower and the cuvette carrier.

FIG. 10 is a reproduction of a typical diagram of the recording made to assay rate and determine specificity of a three reaction enzyme mixture occurring simultaneously in different cuvettes.

FIG. 10a is a greatly enlarged reproduction of a portion of the recording diagram of FIG. 10.

A preliminary understanding of the operation of the invention is best obtained through an examination of FIGS. 1 and 2 of the drawings.

The apparatus of the invention includes a source of monochromatic light 20 which is suitably collimated or refracted or in any other optical manner narrowed to a fine beam of light such as indicated at 22, passed through a suitable iris or slit 24, and thence through one of the cuvettes shown on the carrier 26. There are four cuvettes, designated 28a, 28b, 28c and 28d, each having a different sample of some kind therein, or a standard sample or the like. The carrier 26 is suitably positioned by a mechanical moving means designated generally 30 and including a follower 37 and cam 34, a connecting link in the form of a push rod 36 mounting the follower, and a motor 38 driving the cam. The motor is controlled by a suitable control device designated generally 40 through electrical connections symbolically designated 41. The control device 40 also is arranged to control the operation of an automatic recording device 42 through a disabling connection which is designated 44.

Light emerging from the cuvette under observation at any given time passes to a photo-sensitive device 46 which is a photo-multiplier in the preferred embodiment, and thence through an amplifier 48 to the recorder 42.

In FIG. 1, the source of light 50 may be of any conventional construction having sufficient quality to provide a good monochromatic light of suitable beam dimension and having the needed control for spectral analysis. The source 50 may comprise the monochromatic source 20, the slit 24, and any refinements that the manufacturer may have included therein.

The control device 40 is shown as a small cabinet which houses relays, switches and the like to accomplish the needed control. The details will be set forth hereinafter. The means for mechanically moving the cuvette carrier, the carrier and cuvettes, all are disposed in a suitable housing such as shown at 52 in FIG. 1 cabled to the other components of the system.

Normally the housing 52 with its mechanisms is arranged to be mounted directly upon the source 50 at the end thereof from which the beam of monochromatic light normally would emerge. This, of course, is to maintain the distance between the source of light and the cuvette under observation as short as possible.

The housing 52 also carries on its surface another housing 54 within which the photo-sensitive device 46, and perhaps a portion of the amplifier 48 may be disposed. In any event, at least the photo-sensitive device is located in the housing in close proximity to the cuvette through which the beam is passing. The signal from the photo-sensitive device is transmitted to the amplifier 48 through suitable connections 56 and the output of the amplifier is applied to the recorder 42 via a channel 58.

The amplifier 48 is preferably of a construction which provides an output that is directly proportional to the absorbance of the substance being observed. This is accomplished by having a logarithmic characteristic to compensate for the logarithmic character of the absorbance function. Such circuitry is known and has been in use for some time.

The recorder is preferably of the self-balancing type with a scale of range in which the amplifier 48 normally operates. In a typical structure, the recorder has a chart paper which is translated along the X axis at a speed of 12 to 30 inches per hour, and a fast response time of the order of one second for full scale movement of the pen.

The construction and function of components such as the source 50, the recorder 42 and the amplifier 48 with its photo-sensitive tube 46 are too well known to require detailed explanation, although some enlargement upon the nature of these respective components at this point may aid in an understanding and appreciation of the invention as set forth hereinafter.

The conventional source chosen for use herein is required to have a source of monochromatic light, either with or without means for changing the wave length thereof. The light source is required to be stabilized by any suitable means, such as regulation circuits and the like. Obviously any suitable monochromatic source of light with such a stabilized source can be used, and indeed, the claims appended hereinafter will make reference to a monochromatic light source.

The recorder 42 is of conventional construction, but the pen moving means of the recorder is provided with a connection that can be opened during movement of the cuvettes so as to effectively immobilize the pen during such movement. The pen of the recorder will therefore execute a substantially straight line as soon as the next test cuvette is in position, running from the value of absorbance for the studied substance in one cuvette to the value of absorbance of the substance in the next cuvette which is "seen" by the apparatus, whether the same cuvette or a different one.

The amplifier 48 and the photo-sensitive device 46 together comprise what may be termed an optical density converter. Preferably the photo-sensitive device is a photomultiplier tube and the amplifier includes a feedback circuit which keeps the anode current constant regardless of input light level. The output current of the tube provides the necessary signals which are treated further to render their characteristics linear, and this is the output applied by way of the channel of path 58 to the input circuit of the recorder 42.

The control device 40 and that portion of the cuvette moving mechanism 30 which is related thereto are both shown in the circuit diagram of FIG. 8 to which attention is now invited. Reference may also be had to the illustration of the housing of the control apparatus shown in FIG. 1. There are several manually operable controls on the housing such as, for example, six push buttons operating switches and the like. This arrangement assumes that there are four positions for cuvettes and that four of the buttons are for selecting the cuvettes which will be positioned in the light beam. The switch buttons which select the cuvettes are designated 60, 62, 64 and 66. The switch button 68 controls the operation of a mechanism which continuously recycles the positioning of the cuvettes automatically. These switch buttons are preferably marked with indicia, 1, 2, 3, 4 and Auto, respectively to give graphic representation to the position control function of each. The switches are preferably of the self-locking and releasing type, so that the depressing of one button will release all of the others which are not also pressed simultaneously. Thus, if all of the buttons 60, 62, 64 and 66 are simultaneously depressed, another push button is needed to release them. This is the stop button 70, mechanically connected with the others.

The knob or lever 72 controls the timer mechanism, adjusting its cycle to any desired time at each cuvette position.

The cuvettes are mounted on a carrier that is moved by means of a cam and follower arrangement that will be described, the cam being rotated by a motor 38 shown in FIG. 8 as a rotor 74 and a pair of stator windings 76 and 78. This motor 38 is a split phase type, designed for dynamic braking requiring a capacitor in one phase, and hence the capacitor 80 is connected across the windings 76 and 78 by way of the conductors 82 and 84. The motor can thus be de-energized and brought to a stop rapidly simply by short-circuiting the capacitor through a suitable bypass as will be described.

The rotor 74 carries a switch lever 86 which during its rotation, engages the projections 88, 90, 92 and 94 of the switches 89, 91, 93 and 95 respectively. The switches each have a pivoted arm 96, 98, 100 and 102 to which the projections are respectively secured, the arms being biased to engage against the inner contacts 104, 106, 108 and 110 of the respective switches. As the switch lever 86 passes each projection, it swings the arm of that projection to move from its inner contact and engage against its outer contact. Thus, there are four outer contacts 112, 114, 116 and 118. The words "inner" and "outer" refer merely to the radial positions of the contacts with respect to the axis of rotation of the rotor 74 inwardly or outwardly of the arm. The large numerals 1 to 4 identify the cuvette controlled by the respective switches.

The outer contacts 112, 114, 116 and 118 connect to respective indicating devices, such as gaseous discharge lamps 120, 122, 124 and 126 respectively. The lamps, which are preferably small neon bulbs, have a common current return lead 128 that is provided with a series ballasting resistor 130 and is connected to the power bus 132. Each of the arms 96, 98, 100 and 102 is connected to the other side of the source of power through suitable connections so that as the lever 86 rotates, each time it engages an arm, the lamp connected with the outer contact of that arm will ignite. The lamps are suitably identified for the operator so that the operator knows which of the cuvettes is positioned in the beam of light.

The arm 96 connects by way of the lead 134 with the line terminal 142 through fuse 140. The power line 142–144 is intended to be a conventional 118 volt, 60 cycle, A.C. line coupled by a suitable pronged plug engaged in an outlet.

The conductor 134 also connects with the conductor 146 that extends to the connection 148 between the stator windings 76 and 78. The contact 104 of the switch 89 connects with the arm 98 of the switch 91; the contact 106 of the switch 91 connects with the arm 100 of the switch 93; and the contact 108 of the switch 93 connects with the arm 102 of the switch 95. Each of the inner contacts just mentioned is connected to a different one of the push button switches to enable the controlled placement of the cuvettes.

The push button switches 60, 62, 64, 66 and 68 each have a pair of arms which are adapted to be moved to either one of two positions. The arms of the switch 60 are 152 and 154; the arms of the switch 62 are 156 and 158; the arms of the switch 64 are 160 and 162; and the arms of the switch 66 are 164 and 166. The" Automatic" switch 68 has one arm 168. The "Off" button 70 is mechanical, as previously stated.

Each of the arms has a contact associated therewith, the upper contacts as viewed in FIG. 8 being normally engaged against the respective arms when the push-buttons are not depressed while the contacts adjacent the lower arms being open under such circumstances. Depressing any of the push-buttons will cause the reverse situation to exist, namely, each of the upper contacts will become disengaged from its respective arm while each lower contact will engage its adjacent arm. The upper contacts are identified as 170, 172, 174 and 176. There may be an upper arm and contact on the switch 68 but it is not used. The lower contacts are designated 178, 180, 182, 184 and 187. The connecting broken vertical lines between the pairs of arms indicate that pairs of arms move simultaneously upon depression or raising of the particular push-button. The connecting slanted broken line between all of the lower arms indicates that any single push-button upon being pressed will release the remaining push-buttons and cause them to return to their undepressed condition, unless the push-buttons are pressed simultaneously. It will be understood that in the use of the apparatus, the push-buttons marked 1, 2, 3, 4 and "Auto" may all be depressed simultaneously and will stay depressed, or any one or more of the first four may be depressed alone or with the "Auto" push-button.

The condition which is illustrated in FIG. 8 is one in which none of the push-buttons is depressed. Under such circumstances, the jumpers 186, 188, 190 and 192 connect all of the upper arms and their contacts in series with the conductor 194 and the rectifier or diode 196. This latter element is for the purpose of converting the alternating current into a direct current for operating a D.C. relay 198, the solenoid of which is indicated at 200. A storage condenser 202 is connected across the said solenoid, with the return conductor 204 extending to the power bus 132.

Each of the jumpers is connected with one of the respective arms of the switches that are adapted to be operated by the motor 38 during rotation of the rotor 74 and lever 86. Thus the jumper 186 is connected by way of the lead 134 to the arm 96 as previously stated; the jumper 188 is connected by the lead 206 to the arm 98; the jumper 190 is connected by the lead 208 to the arm 100; and the jumper 192 is connected by the lead 210 to the arm 102.

The relay 198 controls the operation of three normally closed switches 214, 216 and 218. The switch 214 is the timer switch, the switch 216 is the switch for deactivating the recorder device 42 while the motor is moving, and the switch 218 has the purpose of causing the rotor 74 of the motor 38 to rotate. When the solenoid 200 is energized it separates the contacts of all the switches 214, 216 and 218 from their respective engaging arms. The contact 220 and its arm 222 of timer switch 214 are in a circuit which extends from the contact 187 of the automatic switch 68 by way of the conductor 224 to a timing mechanism 226 and including a lead 228 which connects with the lead 134 that extends to the terminal 142 comprising one side of the power line.

The circuit just described normally is established across the line 142, 144 providing the automatic push-button 68 is depressed and the switch 214 is closed. This latter condition obtains unless the solenoid 200 has been energized, and as will be seen, the solenoid in turn is incapable of being energized to achieve this automatic condition unless any one or more of the cuvette selecting push-buttons 60, 62, 64 and 66 is depressed. The power bus 132 is connected to each of the lower contacts 178, 180, 182 and 184, and the lower switch arms 154, 158, 162, 166 and 168 are all connected to another bus 230 so that the depressing of any one of these cuvette selecting push-buttons will establish a condition of conduction between the line terminal 144 and the power bus 132.

To recapitulate, the timer device 226 will not operate even if the "Automatic" push-button 68 is depressed unless at least one of the push-buttons 60, 62, 64 or 66 is depressed.

The switch 216 closes a circuit by way of a jack 232 to the recorder device 42 whenever the solenoid 200 is deenergized. The channel or conducting path is designated 44, as in FIGS. 1 and 2, and extends from the contact 234 and the arm 236, which are separated when the solenoid 200 is energized. The circuit represented by the path 44 may be and preferably is in the energization circuit of a motor or other driving means which drives the pen of the recorder device 42. For example, a field winding in a servo drive motor may be opened.

The opening of the switch 218, upon energization of the solenoid 200, separates its arm 240 from its contact 242, thereby removing a short circuit through the switch 244 from the capacitor 80. The switch 244 has an arm 246 normally engaged with a contact 248. If the rotor 74 of the motor 38 is to be rotated, either one of the switches 218 or 244 must be open. If the switch 218 is open, it is immaterial whether the switch 244 is open or not. On the other hand, if the switch 218 is closed and the switch 244 becomes closed through the operation of the timer 226, the capacitor 80 will be short circuited and the rotor will stop. The timer is adjustable so that the dwell time of the rotor 74, that is the time which it will remain in non-rotating condition with the lever 86 engaged against any one of the projections 88, 90, 92 or 94 is controllable through the adjustment of knob 72.

The timer 226 is self-resetting. If the button 68 is depressed, the energizing of the timer through switch 214 starts the timing cycle, pre-set by the said knob 72. At the end of the preset time, the normally closed switch 244 opens and starts the rotation of rotor 74 carrying switch lever 86 away from that projection upon which it had been resting. Relay 198 is now energized, opening switches 218 and 214. The latter switch causes instantaneous resetting of the timer 226 and closing of switch 244. Since 218 is open, however, capacitor 80 is not short-circuited; and the lever arm 86 continues to rotate until it reaches a projection of 88, 90, 92 or 94 which can, by its engagement, de-energize relay 198 to close switch 218 and stop the motor. Only projections whose push-buttons have been depressed will, upon engagement, result in de-energization of solenoid 200.

By tracing the circuit which has been described above, it will become apparent that the lever 86 will not rotate unless any one or more of the push-buttons 60, 62, 64 or 66 is depressed. If any one of the push-buttons 60, 62, 64 or 66 is depressed, the only thing that will occur is that the rotor 74 will rotate the lever 86 to engage the projection of the arm of that switch of the group 89, 91, 93 and 95 associated with the circuit of the particular push-button that has been pressed. The condition will remain so long as the operator desires, and without change. In the event that one of the push-buttons 60, 62, 64 or 66 is depressed along with the "Automatic" button 68, the rotor 74 will rotate until it reaches the particular projection of 88, 90, 92 or 94 associated with the circuit of the push-button that has been pressed, will dwell in that position for a length of time controlled by the setting of the timer mechanism 226, and then will quickly rotate one revolution and return to the same dwell position associated with the same sample containing cuvette. This will continue so long as the operator desires. Likewise, if more than one of the push-buttons 60, 62, 64 and 66 is simultaneously depressed, the rotor 74 will rotate, always in the same direction, the lever 86 moving from switch to switch of 89, 91, 93 and 95, and stopping only at those switches whose push-button has been depressed, for the length of time controlled by the setting of the timer mechanism 226. It will be noted that each time the lever 86 engages one of the projections 88, 90, 92 or 94, the associated neon lamp 120, 122, 124 or 126 will ignite and remain ignited so long as the lever 86 engages the particular projection.

Another procedure which may be followed using the apparatus, is depressing more than one of push-buttons 60, 62, 64 and 66 without depressing the automatic push-button 68. In this case, the rotor 74 will rotate until the nearest projection is engaged and will remain on this projection until the motor 38 is manually energized by some switch means, for example, not shown in the drawing. This could be, for example, a momentary opening switch in the loop which short circuits the capacitor 80.

In order to demonstrate and trace the circuitry for the conditions which have been described above, it will be assumed that the apparatus is in the condition shown in FIG. 8 with clockwise being the normal direction of rotation of the rotor 74 and its associated lever 86 indicated by the arrow. Assume that the push-button 64 is depressed and permitted to remain in this condition. As soon as the push-button 64 is depressed, contact is established between the arm 162 and the lower contact 182 applying power to the bus 132. The upper contact 174 is now separated from the arm 160, and power is applied to the conductor 208 through the arms and contacts to the left of the jumper 190. This establishes a connection by way of arm 100, contact 108, arm 102, contact 110, lead 194, rectifier 196, to energize solenoid 200 and open switches 214, 216 and 218. The motor terminal 148 is always connected to one side of the line through lead 134. The power bus 132 connects with the lead 82 directly and the stator winding 78, while connecting through the capacitor 80 and the lead 84 to the other stator winding 76. Under these circumstances, the rotor 74 will commence rotating in a clockwise direction. It will be recalled that capacitor 80 is not short-circuited when switch 218 is open.

As the rotor 74 commences to rotate, the lever 86 engages against the projection 90 and raises the arm 98 from its inner contact 106 to its outer contact 114; thus, the circuit from the contact 114 through the conductor leading to the lamp 122 back through the ballast resistor 130 to the bus 132 is completed. The arm 98 is now in a circuit which extends by way of the conductor 206 to the jumper 188, thereby establishing a complete circuit to the lines 142 and 144 for the lamp 122, which is labelled 2. The lamp will therefore ignite, indicating that the second cuvette position has been reached. It will be noted that the terminal 148 is still connected to the line terminal 142 through the conductor 134. The bus 132 is still also connected to the other terminal 144 of the line by way of a circuit which is readily traced and hence the motor 38 continues to be energized and merely passes the projection 90 and lights the lamp 2 only momentarily.

Next, the lever 86 engages the projection 92 and raises the arm 100 from the contact 108 to the contact 116. The No. 2 lamp 122, in the meantime, has become extinguished. As soon as the circuit is established through the lamp 124 from the contact 116 through the arm 100 to the conductor 208, the lamp 3 ignites, and will stay ignited so long as the lever 86 remains on the projection 92, denoting that the third cuvette position was the selected position. With the arm 100 engaging against the contact 116, circuit is broken between the conductor 208 and the contact 108. This, it will be recalled, was an essential link to the source of power for the solenoid 200 through the rectifier 196 by way of the conductor 194, the contact 110 and the arm 102. Removing power from the solenoid 200 causes the same to be de-energized and therefore all three of the switches 214, 216 and 218 are once more closed.

Since the normal condition of the timer 226 is with the switch 244 closed, the further closing of the switch 218 will short circuit the capacitor 80 and the rotor 74 will stop rotating and remain in that position until the short circuit is removed. While the solenoid 200 was energized, it will be appreciated that the channel 44 leading from the jack 232 to the recording device 42 was open, thereby disabling the recorder device 42 and preventing the recording pen from moving. Also, the timer circuit was open and it was not operating since it had not been energized by depression of the push-button 68. If the button had been depressed, timer 226 would have commenced cycling when the solenoid 200 became de-energized.

The condition described, namely with the lever 86 resting upon the projection 92 and keeping the arm 100 off the contact 108 will remain until the operator changes the condition of the push-buttons. He may do this by depressing another cuvette positioning button if he so desires, in which case by procedure similarly traced the lever will move through all of the intervening positions to the new position at which it will remain.

Depressing the "Automatic" push-button 68 closes the circuit from the contact 187 through the conductor 244 and through the timer 226 and the switch 214 as previously explained. When the motor commences rotating, the switch 214 is opened and the timer is reset, but as soon as the motor stops rotating, the timer commences to operate and after a preset interval it will open the switch 244, thereby enabling the motor once more to commence its rotation. As soon as the lever 86 moves off of the projection involved, conditions are established which will keep the motor rotating, including energization of the solenoid 200. If the push-button of the next projection has been depressed, the lever 86 will stop at that position for a period of time controlled by the setting of the timer 226.

It is believed that the above explanation should enable one to understand the manner in which it is possible to control rotation of the motor 38, thereby discretely selecting one of a multiplicity of cuvettes, perform the various functions of disabling the recorder device 42 during rotation of the motor, and operate the cuvette position indicator lamps 120, 122, 124 and 126. In its basic concept, the control circuit comprises the switches 89, 91, 93 and 95 in series with solenoid 200, each switch being shunted by a push-button switch, 62, 64, 66 and 68, respectively. Opening of any one of the normally closed switches 89, 91, 93 or 95 by the lever 86 will only be effective to de-energize relay 198 if its corresponding normally closed push-button switch has been opened by manual selection.

Attention is now invited to the mechanism by means of which the multiplicity of cuvettes are moved to the positions desired through operation of the motor and its foregoing described switch controls. In FIGS. 3, 4, 5, 6, 7 and 9 the mechanical construction of the cuvette positioning device 30 is illustrated.

Referring now to FIG. 3, the housing for the cuvette positioning apparatus 52 is shown in sectional view. The housing is formed as an enclosure providing two chambers 300 and 302 separated by a vertical partition or wall 304. The chamber 300 is that in which the cuvettes 28a, 28b, 28c and 28d are adapted to be translated. These cuvettes are of any conventional construction and, as understood, are transparent front to back as viewed in FIG. 3. They are all mounted on a resilient U-shaped clamping member 306 provided with a hold-down plate 308 fastened to a suitable carriage 310 which is mounted upon a pair of guide rods 312, secured between blocks 314 and 316 located at opposite ends of the chamber 300. The bottom of the chamber 300 is closed off by means of a wall 318 which mounts a pin 320. The bottom of the carriage 310 mounts an additional pin 322 and there is a helical spring 324 stretched between the respective pins 320 and 322 for the purpose of biasing the carriage 310 to move to the left as viewed in FIG. 3.

Since the light from the monochromatic source is adapted to be passed through one of the cuvettes disposed in the chamber 300 it is essential that the chamber 300 be light tight so that stray light does not enter and cause fallacious indications of light absorbance. The right hand edge of the chamber 300 is closed off by a wall 326, and the rear and front sides of the chamber are closed off by suitable plates 328 and 330 maintained in spaced apart relationship by the blocks 314, 316 and additional blocks 332 and 333 secured at opposite upper ends of the chamber 300 by any suitable fastening means, such as those shown in the drawing and not designated by reference characters. A cover plate 334 closes off the top of the chamber 300 and is adapted to be removed by means of a suitable handle 335. This gives ready access to the chamber 300. The chamber 300, as previously stated, is adapted to be secured directly over the slit of the monochromatic source such as the source 50. In order that the light pass through the chamber, each of the side walls 328 and 330 is provided with a aligned opening such as that shown at 336.

The cuvette positioning mechanism provides as many positions of dwell as the number of cuvettes the clamping member 306 is adapted to accommodate. Thus in the particular structure which is shown there are four cuvettes capable of being placed upon the clamping member 306 and there are four dwell positions achieved in a manner which presently will be described.

The chamber 302 is defined by a rear wall 338 and a front wall or plate 340, and by the partitioning wall 304. A removable U-shaped cover plate is secured around the top, bottom and left hand edges of the chamber 302 as viewed in FIG. 3 to define the top, end and bottom walls 340', 342 and 344. Any suitable construction may be used, although for convenience the wall 388 and the wall 328 are an integral plate member thus providing a unitary construction to the entire assemblage, and the U-shaped member forming the walls 340', 342 and 344 has suitable spacing blocks such as shown at 346 secured thereto by bolts or the like. It will be noted that the width of the plate 340 is such that it does not reach to the partitioning wall 304 so that the cover plate 330 overlaps upon a portion of the right hand end of the chamber 302. This is a desirable structure in order to preserve the light exclusive character of the chamber 300.

Portions of the cuvette positioning mechanism are disposed within the chamber 302 and certain other portions are disposed mounted upon the surface of the plate 340 exterior of the chamber 302. The portions of the mechanism which are mounted on the surface of the plate 340 are covered by a removable shallow box-like enclosure 350 held in place by suitable screws with suitable perforations 356 to enable the indicator lights or lamps 120, 122, 124 and 126 to protrude.

The left hand end of the carriage 310 is secured to a rigid push rod 358 by any suitable means such as a pin 360. The push rod extends through an opening 362 provided in the partition wall 304 and the block 314 is notched at its top in order to permit passage of the said push rod. At its left hand end, as viewed in FIG. 6, the push rod is provided with a yoke 364 between the bifurcation of which there is mounted a cam follower 366. The cam follower is preferably in the form of a hardened roller mounted on a shaft 368. On opposite ends of the shaft, as shown in FIG. 7, are preferably provided antifriction guide rollers 370 and 372, these rollers being free to rotate independently. Guide ways for the rollers are provided at 374 and 376, defined by upper and lower track members 378 and 379 respectively. In FIG. 7 the upper track members are shown to the left. The track members are secured between the plate 340 and the rear wall 338 by suitable fastening means, such as for example screws 380 and spacers 382, and may serve as means for maintaining the spacing between the said plate 340 and the wall 338. Obviously the length of the track members 378 and 379 and the guide ways 374 and 376 defined thereby must be such as to accommodate the complete stroke of the carriage 310 to guide the said movement rectilinearly.

As shown in FIG. 4, the split phase electric motor 38 is mounted to the rear of the plate 338 by any suitable means, with its shaft 384 protruding into the chamber 302 by way of a suitable opening 386. A portion of the shaft 384 also extends past the plate 340 for a purpose presently to be described, and there is also an opening 388 in the plate 340. A flat cam 390 of suitable contour, which will be described in detail, is mounted to a hub 392 secured to the shaft 384 by a set screw 394 so that rotation of the shaft 384 will result in rotation of the cam 390. The follower 366 is adapted to engage against the contoured edge of the cam so that rotation of the cam will result in translation of the cuvette carriage 310 right and left as viewed in FIG. 3. A second bushing or hub 396 is mounted to the end of the shaft 384 by means of a set screw 398 and provides a braking surface for a nylon brake shoe 400 mounted to the plate 340 by a screw 402 with its jaws engaged over the hub 396. The hub stud 404 mounts the switch lever 86 by means of a nut 406. Obviously, the circumferential locations of the cam 390 and the switch lever 86 relative to one another are adjustable. The plate 340 may be considered a switch plate since it mounts the four switches 89, 91, 93 and 95. In the commercial example these switches were in the form of enclosed micro-movement multiple contact switches actuated by rollers, the latter constituting the projections 88, 90, 92 and 94 described in connection with FIG. 8.

The lamps 120, 122, 124 and 126 are mounted on a suitable bracket 408 which is secured to the switch plate 340. A receptacle for a cable is shown at 410. For convenience, none of the wiring is shown in the drawings of the mechanical apparatus in order not to confuse the same, although the connections are readily ascertained through an examination of FIG. 8.

Attention is now invited to FIG. 9, which is a semi-diagrammatic view showing the manner by which translation of the cuvette carriage 310 is obtained. For the four desired positions of the cuvettes, it is necessary that the carriage 310 be moved accordingly. If it is assumed that the opening 336 to be properly aligned with the cuvette 28d, as shown in FIG. 3, under such circumstances the roller 366 would be engaged upon that portion of the cam contour which is designated 412. The cam portion 412 is one of a multiplicity of dwell portions each defined by a different radius of curvature. Movement of the cam follower 366 along each dwell portion cannot induce rectilinear translation of the push rod 358, since the rolling of the cam follower over any dwell portion does not change its position relative to motor axis 384 which is the pivot point of the cam. Accordingly, precise stoppage of the motor 38, such as by complex and expensive mechanical or electromechanical detents, is unnecessary. The previously described and relatively inexpensive dynamic break in combination with the cuvette selection switches is more than sufficiently accurate to produce the precise interpositioning of each cuvette relative to the openings 336 and the beam of light passing therethrough.

The next dwell portion of the cam is designated 414 and it is on a radius $R_2$. The radial distance between $R_1$ and $R_2$ represents the distance which the carriage 310 must be moved to the right in order that the opening 336 be in perfect alignment with the center of the cuvette 28c. The configuration of the cam edge between the areas 412 and 414 is of little consequence so long as the movement of the cuvette carriage is not so uneven as to produce turbulence in the samples. In the same manner, dwell areas of the cam along its contoured edge are provided at 416 and 418 respectively, with radii $R_3$ and $R_4$ corresponding to the third and fourth positions of the carriage 310, properly positioning the cuvettes 28b and 28a. It will be appreciated that the carriage 310 will closely follow the movements of the cam due to the presence of the spring 324 continuously urging the carriage 310 to the left as viewed in FIG. 3.

In this manner, if the cam 390 is accurately made, which is no mechanical problem, the cuvettes 28a, 28b, 28c and 28d will be very precisely located relative to the opening 336 for each position of dwell of the cam 390 and its follower 366. Thereby, the cuvettes are capable of being readily aligned with the beam of light coming from the monochromatic source.

If the push-button corresponding to the particular cuvette has been depressed, the dynamic braking of the motor 38, when lever arm 86 engages the projection 92, for example, will stop rotation of cam 390. Due to the circumferential extent of the arcuate dwell portion even overshoot or stopping short cannot disturb the accuracy of alignment.

As noted in FIG. 1, the housing 54, which carries the photo-sensitive device 46, is adapted to be fastened to the front surface of the plate 330 in the general location indicated by the broken line outline in FIG. 3. It will be thus aligned with the opening 336 and responds to such light as passes through the particular cuvette which is located in intercepting position relative to the beam of light from the monochromatic source.

To provide general recapitulation of the operation of the apparatus, for an automatic recording of reactions proceeding in several cuvettes, the timer control knob 72 is adjusted to the amount of dwell it is desired occur when each of the pertinent cuvettes is located in the beam of light, and the buttons 60, 62, 64 and 66 corresponding to the cuvettes together with the "Automatic" push-button 68 are depressed. The motor will drive the cam to position each of the cuvettes in alignment with the beam for the time which has been set on the timer 226. Between dwell positions of the cam 390 and its follower 366, the recorder 42 will be disabled and the pen will not move. Each time that a cuvette is positioned in the front of the opening 336, the indicator light 120, 122, 124 or 126 corresponding to that cuvette will be lighted and will remain lighted so long as the cuvette is in the particular position. When it is desired that the recording cease, the operator depresses the stop button 70.

In order further to illustrate the manner in which the apparatus is used for making a record of multiplicity reactions occurring simultaneously in multiplicity different cuvettes, the resulting recording sheet with interpretive information is shown in FIGS. 10 and 10a. There is illustrated a section of the recording paper taken from an actual run in which the paper moves relatively to the left and a recording therefore starts at the left and proceeds continuously to the right. Four cuvettes were used in this case, one of which served as a standard and had either an undiluted sample, or water, or was simply blank. The others had reactions occurring of a related nature, such as for example of enzyme alone, with different proportions of added reagents or different added reagents. As noted, the scale at the left comprises the absorbance as recorded by the recorder 42 and the bottom scale is a time scale with the distance between vertical lines as indicated corresponding to the time interval set by the adjustment 72 of the timer 226. The absorbance scale can be adjusted to any given value by scale factor controls inherent in the construction of the amplifier 48. Usually the range over which this experiment is to be conducted is fairly well known and hence the number of units of this range is chosen to be substantially the full scale excursion of the recorder pen. As readily seen from FIGS. 10 and 10a, four distinctly labeled curves have been coterminously plotted. Of each set of four adjacent, generally horizontal, plots, the lowest, shown as 420 in FIG. 10a and "Standard" in FIG. 10, represents the absorbance of the contents of the standard or blank cuvette, such as the cuvette 28d. The other reaction curves A, B, and C in FIG. 10 comprise respectively repeated progressive plots of the graph segments 424, 428, and 432 shown in FIG. 10a. Each discrete, generally horizontal segment 420, 424, 428, and 432 denotes the relative absorbance of the contents of its associated cuvette during the relatively short period of time that that cuvette is immobilized in a precise position between the light source 20 and the photosensitive device 46, as illustrated in FIG. 2. This may represent a time of two and one-half to sixty seconds. After the completion of the recording as determined by the timer 226, the cam rotates very quickly to its next position. During this movement, the recording pen stops any movement. The approximate time between dwell positions of the cam is one and one-half seconds with a motor that rotates at approximately 10 r.p.m.

As previously described, during the short intervals that the switch 218 is opened and motor 38 drives the cam 390 for repositioning the cuvette carriage, the switch 216 also is opened. When the next test position of the cuvette carriage is reached, the motor is de-energized, the switch 216 closes, the recorder is once more energized, the pen immediately moves along the path 422 to the next position very quickly, and commences to record the changes occurring in second cuvette 28c at the level 424. Subsequent to the precise sequential positionings of the cuvettes 28c, 28b, and 28a, the pen moves along the path 426 to the third position 428, records, moves along the path 430 to the last position 432, records and then once more returns along the line 434 to graph the absorbance of the contents in the sample cuvette 28d, which ideally would be a horizontal extension of the segment 420. This continues throughout the entire run with the result of formation of the recording which is shown in FIG. 10.

It is believed that the invention has been sufficiently explained without any further detail such as to enable those skilled in this art to understand the complete operation thereof. It is desired to point out that considerable variation is capable of being made without in any way departing from the spirit or scope of the invention as defined in claims appended hereinafter.

What it is desired to be secured by Letters Patent in the United States is:

1. Apparatus for the programmed selection of a multiplicity of cuvettes and for recording coterminously the measurement of the absorption characteristic of a sample disposed in each selected cuvette as a function of time upon a single recording surface, which comprises:
 (a) means for generating a beam of radiant energy;
 (b) means for transporting the cuvettes into the path of the beam, said transporting means comprising:
  (i) a rack for supporting the cuvettes;
  (ii) means for supporting the rack in the path of the beam and for allowing movement of the rack along a path transverse to the axis of the beam;
  (iii) a motor driven cam having at least as many lobes of different radii as the number of cuvettes which the rack can support; and
  (iv) cam follower means for moving the rack along the supporting means;
 (c) control means for programming the operation of the transporting means for repetitive cycles of movement during which selected cuvettes are held in a measurement position in the path of the beam for a predetermined measurement period;
 (d) transducer means for generating an output signal having a parameter which is a function of the amount of beam energy absorbed by a sample in a selected cuvette; and
 (e) means for recording coterminously the magnitude of the parameter of the output signal which is a function of the amount of beam energy absorbed by a sample in a selected cuvette for each selected cuvette upon a single recording surface solely as a function of time.

2. Apparatus for recording continuously the light absorbance of a plurality of samples disposed respectively in separate cuvettes, some of which may be selected, which comprises: a source of light and means forming a beam of said light, a cuvette positioning device having cuvettes arranged for sequential disposition thereof intercepting the beam, electric circuit pre-settable control means programming the operation of the positioning device for repetitive cycles of selected cuvettes in said disposition for a predetermined measuring period, menas for converting the light passing through a cuvette into an output signal the character of which is related to the absorbance in the cuvette and including photo-sensitive means arranged in the beam at a position to receive light that has passed through said cuvette, and recording means adapted to record the relative amplitudes of the absorbance output signals during the measuring periods of the selected cuvettes solely as a function of time upon a single recording surface, said recording means comprising marking means movable in a first direction in response to output signals and a recording surface for receiving marks applied by the marking means, said recording surface moving with respect to said marking means in a second direction transverse to said first direction, wherein said control means has means for stopping the movement of the marking means upon the recording surface in said first direction at such times as the cuvettes are being moved between their respective positions and wherein said recorder registers an indication of relative signal amplitude only when a cuvette is in proper intercepting disposition.

3. Apparatus for recording continuously the light absorbance of a plurality of samples disposed in separate selected cuvettes, which comprises, a source of light and means forming a beam of such light, means transporting cuvettes in paths which repeatedly dispose the cuvettes sequentially in the beam and hold each selected cuvette in said beam for a predetermined time, means arranged to receive the beam after passing through the cuvettes when so disposed and to convert same into an electric signal the character of which is related to the absorbance of the sample in whichever selected cuvette is in the beam at the time, recorder means comprising a movable marking member and a recording surface movable with respect to said member in a direction transverse to the movement of said member, and the electric signal being applied to the recorder means to obtain a recording, first electrical circuit means adapted to activate said recorder means so as to cause said marking member to place an indication of absorbance signal amplitude upon said recording surface, a second electric circuit for energizing said transporting means, and relay means for rendering the first circuit inoperative when the second circuit is operative, said transporting means comprising an electric motor, the first circuit means including a normally closed switch and the second electrical circuit comprising a shunting loop connected in parallel with an energizing winding of said motor to deactivate same when said loop is closed, and said relay means operable to open both of said first and second circuits simultaneously to operate the motor and deactivate said recorder means.

4. The combination in an apparatus for recording absorbance of samples in a plurality of cuvettes each being moved to a signal producing position in a continuously repetitive cycle, and having signal producing means, comprising, means for moving the cuvettes in a repetitive cycle respectively to said position and including an electric motor, a control apparatus for said motor, and a recording instrument adapted to receive signals from said signal producing means related to absorbance, said control apparatus including an electromagnetically energized three circuit switch device, one circuit controlling the operation of said recording instrument, one circuit controlling the energization of said motor, and one circuit controlling the re-cycling of motion of said cuvettes, and manual means for selectively pre-setting the control apparatus to perform the functions of energizing the motor while the recording instrument is de-energized and vise versa, and energizing the re-cycling circuit to energize the motor a predetermined time after said motor has been stopped at any position.

5. Apparatus as recited in claim 1 wherein said cam follower means is mounted with respect to said cam to be reciprocated thereby and said transverse path is rectilinear, the movement of said cam follower means and said rack being interrupted both during absence of drive by said motor and during coaction of said cam follower means with each of said lobes.

6. Apparatus for recording coterminously the light absorbance of a multiplicity of samples disposed respectively in separate cuvettes, some of which may be selected, which comprises: a source of light and means forming a beam of said light, a movable cuvette carrier having holder means for a multiplicity of cuvettes; a cuvette positioning device drivingly coupled with said carrier to move it in a path which disposes the carrier in a multiplicity of positions relative to the beam, such that each cuvette mounted on said carrier sequentially intercepts the beam; electric circuit pre-settable control means programming the operation of the positioning device to produce repetitive cycles of selected cuvettes in said beam-intercepting positions for a predetermined measuring period; means converting the light passing through a cuvette, when in its beam-intercepting position, into an output signal the character of which is related to the absorbance in the cuvette and including photo-sensitive means arranged in the beam at a position to receive light that has passed through said cuvette; and recording means which coterminously records the relative amplitudes of the absorbance output signals of all selected cuvettes during the measuring periods of the said selected cuvettes, solely as a function of time, upon a single recording surface; said recording means comprising marking means movable in a first direction in response to said absorbance output signals, means applying the said absorbance signals to said marking means to cause said movement thereof in said one direction in an amount proportional to absorbance, and a recording surface receiving marks applied by the marking means, said recording surface moving with respect to said marking means in a second direction transverse to said first direction, said control means having means inhibiting the absorbance output signals from being applied by said applying means to said marking means while said cuvettes are being moved between their respective beam-intercepting positions to prevent the movement of the marking means in said first direction at such times as the cuvette carrier is being moved.

7. Apparatus as claimed in claim 6 in which said means inhibiting said absorbance output signals prevents all movement of said marking means during the times the cuvette carrier is being moved.

8. Apparatus for the programmed selection of a multiplicity of cuvettes and for recording coterminously the measurement of the absorption characteristic of a sample disposed in each selected cuvette as a function of time upon a single recording surface, which comprises:
 (a) means for generating a beam of radiant energy;
 (b) means for transporting the cuvettes into the path of the beam;
 (c) control means for programming the operation of the transporting means for repetitive cycles of movement during which selected cuvettes are held in a measurement position in the path of the beam for a predetermined measurement period, said control means comprising:
  (i) means for selecting each of the cuvettes containing a sample to be measured;
  (ii) means for stopping the transporting means when a selected cuvette is properly disposed in the beam path for measurement;
  (iii) means for adjusting the length of the measurement period; and
  (iv) means for starting the transporting means at the end of the measurement period;
 (d) transducer means for generating an output signal having a parameter which is a function of the amount of beam energy absorbed by a sample in a selected cuvette; and
 (e) means for recording coterminously the magnitude of the parameter of the output signal which is a function of the amount of beam energy absorbed by a sample in a selected cuvette for each selected cuvette upon a single recording surface solely as a function of time, said means for recording including marking means having motion relative to said recording surface in response to said output signal when a selected cuvette is properly disposed in the beam path for measurement, said control means and said means for recording being intercoupled for exerting disabling control upon said means for recording during the periods of time that the transporting means is transporting said cuvettes, such that during said time periods said marking means is prevented from being responsive to said output signal.

9. Apparatus for the programmed selection of a multiplicity of cuvettes and for recording coterminously the measurement of the absorption characteristic of a sample disposed in each selected cuvette as a function of time upon a single recording surface, which comprises:
 (a) means for generating a beam of radiant energy;
 (b) means for transporting the cuvettes into the path of the beam;
 (c) control means for programming the operation of the transporting means for repetitive cycles of movement during which selected cuvettes are held in a measurement position in the path of the beam for a predetermined measurement period;
 (d) transducer means for generating an output signal having a parameter which is a function of the amount of beam energy absorbed by a sample in a selected cuvette;
 (e) means for recording coterminously the magnitude of the parameter of the output signal which is a function of the amount of beam energy absorbed by a sample in a selected cuvette for each selected cuvette upon a single recording surface solely as a function of time, said recording means comprising:
  (i) marking means movable along a locus in response to output signals received from the transducer means;
  (ii) a recording surface, for receiving marks applied by the marking means; and
  (iii) means for causing the relative movement of the recording surface and the marking means in a direction transverse to the marking means locus;
 (f) means for generating a signal indicating that a selected cuvette is in said measurement position; and
 (g) means enabling the movement of the marking means along said locus upon receipt of such measurement position signal and inhibiting that movement in the absence of such signal.

References Cited

UNITED STATES PATENTS

| | | | |
|---|---|---|---|
| 2,675,734 | 4/1954 | Hasler et al. | 88—14 |
| 2,984,146 | 5/1961 | Kwart et al. | 88—14 |
| 3,026,764 | 3/1962 | Allen et al. | 88—14 |

JEWELL H. PEDERSEN, *Primary Examiner.*

DAVID H. RUBIN, *Examiner.*

R. J. STERN, *Assistant Examiner.*